US008871673B2

(12) United States Patent
Schwefer et al.

(10) Patent No.: US 8,871,673 B2
(45) Date of Patent: Oct. 28, 2014

(54) CATALYST PRODUCTION METHOD THEREFOR AND USE THEREOF FOR DECOMPOSING $N_2O$

(75) Inventors: Meinhard Schwefer, Meschede (DE); Rolf Siefert, Rheda-Wiedenbrück (DE); Frank Seifert, Ibbenbüren (DE); Frank Froehlich, Jena (DE); Wolfgang Burckhardt, Hermsdorf (DE)

(73) Assignee: UHDE GmbH, Dortmung (DE)

( * ) Notice: Subject to any disclaimer, the term of this patent is extended or adjusted under 35 U.S.C. 154(b) by 1136 days.

(21) Appl. No.: 12/733,147

(22) PCT Filed: Jul. 11, 2008

(86) PCT No.: PCT/EP2008/005685
§ 371 (c)(1),
(2), (4) Date: Apr. 26, 2010

(87) PCT Pub. No.: WO2009/021586
PCT Pub. Date: Feb. 19, 2009

(65) Prior Publication Data
US 2010/0209325 A1 Aug. 19, 2010

(30) Foreign Application Priority Data
Aug. 14, 2007 (DE) .......................... 10 2007 038 711

(51) Int. Cl.
*B01J 23/58* (2006.01)
*B01D 53/86* (2006.01)
*B01J 23/86* (2006.01)
*B01J 35/10* (2006.01)
*B01J 37/02* (2006.01)

(52) U.S. Cl.
CPC ............ *B01J 23/86* (2013.01); *B01J 35/1014* (2013.01); *B01J 35/10* (2013.01); *B01D 53/8628* (2013.01); *B01D 2255/206* (2013.01); *Y02C 20/10* (2013.01); *B01D 2257/402* (2013.01); *B01J 35/1038* (2013.01); *B01J 37/0205* (2013.01); *B01D 2255/20746* (2013.01); *B01J 37/0244* (2013.01)
USPC .......... 502/328; 502/304; 502/325; 502/340; 423/239.1; 423/583; 423/594.6; 423/594.16; 423/594.19

(58) Field of Classification Search
USPC .............. 502/304, 325, 328, 340; 423/239.1, 423/583, 594.6, 594.16, 594.19
See application file for complete search history.

(56) References Cited

U.S. PATENT DOCUMENTS

| 5,705,136 A | 1/1998 | Drago et al. ............... 423/239.1 |
| 6,402,989 B1 * | 6/2002 | Gaffney ....................... 252/373 |
| 2003/0103892 A1 * | 6/2003 | Niu et al. ..................... 423/651 |
| 2003/0143142 A1 | 7/2003 | Schwefer et al. .......... 423/239.2 |
| 2007/0149392 A1 * | 6/2007 | Ku et al. ...................... 502/240 |

FOREIGN PATENT DOCUMENTS

| DE | 35 04 122 C2 | 8/1986 | |
| DE | 100 056 103 A1 | 8/2001 | |
| EP | 1 147 813 A2 | 10/2001 | |
| FR | 2 860 734 | 4/2005 | |
| JP | 48089185 | 11/1973 | ............ B01D 53/94 |
| WO | WO 00/13789 | 3/2000 | |
| WO | WO 02/02230 | 1/2002 | ............... B01J 23/10 |

OTHER PUBLICATIONS

Biossel et al., Catalytic decomposition of N2O over monolithic supported noble metal-transition metal oxides, Applied Catalysis B: Environmental 64 (2006) 234-242.*
Meng et al., A study on the catalytic synergy effect between noble metals and cobalt phases in Ce—Al—O supported catalysts, Applied Catalysis A: General 301 (2006) 145-151.*
International Preliminary Report on Patentability (Chapter II of the Patent Cooperation Treaty) for corresp. appln. PCT/EP2008/005685.

* cited by examiner

*Primary Examiner* — Kaj K Olsen
*Assistant Examiner* — Pritesh Darji
(74) *Attorney, Agent, or Firm* — Michael W. Ferrell; Ferrells, PLLC

(57) ABSTRACT

Catalysts for the decomposition of $N_2O$ into nitrogen and oxygen in the gas phase, which comprises a porous support composed of polycrystalline or vitreous inorganic material, a cerium oxide functional layer applied thereto and a layer of oxidic cobalt-containing material applied thereto are described.
The catalysts can be used, in particular, as secondary or tertiary catalysts in nitric acid plants.

46 Claims, No Drawings

CATALYST PRODUCTION METHOD THEREFOR AND USE THEREOF FOR DECOMPOSING N₂O

CLAIM FOR PRIORITY

This substitute specification is a submitted as a national phase entry of International Patent Application No. PCT/EP2008/005685, filed Jul. 11, 2008, entitled "Katalysator, Verfahren zu dessen Herstellung und dessen Verwendung" which claims priority to German Patent Application 10 2007 038 711.5, filed Aug. 14, 2007, of the same title. The priorities of International Patent Application No. PCT/EP2008/005685 and German Patent Application 10 2007 038 711.5 are hereby claimed and the references are incorporated herein in their entireties.

BACKGROUND OF THE INVENTION

The present invention relates to supported catalysts for the decomposition of nitrous oxide. These can be used, in particular, in industrial processes in which nitrous oxide is formed, for example the preparation of caprolactam, adipic acid or nitric acid.

In the industrial oxidation of ammonia, for example during the course of the production of nitric acid, formation of the desired nitrogen monoxide NO is accompanied by formation of the undesirable nitrous oxide $N_2O$. This contributes in a not inconsiderable measure to the degradation of stratospheric ozone and to the greenhouse effect. Further sources of nitrous oxide are industrial oxidations using nitric acid as oxidant, for example as carried out in the preparation of adipic acid.

Although the relative proportion by volume of $N_2O$ in the climate-relevant trace gases in the earth's atmosphere is less than 0.1% by volume ($CO_2$: 98.7% by volume, $CH_4$: 1.2% by volume), its greenhouse potential is 310 times that of $CO_2$ and the relative proportion of nitrous oxide therefore amounts to about 30% of the contribution of $CO_2$ to the additional greenhouse effect caused by human beings.

Technical solutions for reducing nitrous oxide emissions, particularly in nitric acid production since this process is the largest source of industrial nitrous oxide emissions, are not only required for reasons of environmental protection but are now also demanded by legislators.

An example of a gas-phase reaction which is carried out on a large scale in industry and is associated with $N_2O$ problems is the preparation of nitric acid. This is generally carried out on the industrial scale by the Ostwald process by means of catalytic oxidation of ammonia over Pt/Rh catalysts. Here, $NH_3$ is oxidized very selectively to NO which is then oxidized to $NO_2$ during the course of the further process and the $NO_2$ is finally reacted with water in an absorption tower to give nitric acid. The Pt/Rh catalysts are configured as fine gauzes and are stretched over a wide area in a burner. A gas mixture of typically about 8-12% by volume of ammonia in air is passed through the gauzes, with a temperature of about 850-950° C. being established at the gauzes as a result of the exothermic reaction.

An overview of the course of nitric acid production and its various process variants is given in Ullmanns Encyclopedia of Industrial Chemistry, Vol. A 17, VCH Weinheim (1991).

There are in principle three different processes and plant engineering possibilities for reducing the $N_2O$ emissions in the offgases from industrial plants such as plants for nitric acid production:

1. Primary Measure

Selective oxidation of ammonia to nitrogen monoxide and avoidance of the undesirable formation of nitrous oxide by modification of the chemical composition of the oxidation catalyst.

2. Secondary Measure

Reduction of the $N_2O$ content of the process gas by installation of a catalyst which selectively decomposes nitrous oxide into its constituents $N_2$ and $O_2$ between the noble metal gauzes which are usually used in the oxidation of ammonia and at which the oxidation takes place and the absorption tower, and also upstream of the first heat exchanger unit after the ammonia oxidation. The process temperature and, associated therewith, the required operating temperature of the catalyst is comparatively high here, for example in the range from 800 to 1000° C.

3. Tertiary Measure

Catalytic decomposition of the $N_2O$ present in the offgases leaving the absorption towers. This is an offgas purification arranged downstream of the actual production process. The offgas temperature and thus also the operating temperature of the catalyst is comparatively low here and varies, depending on the plant type, in the range, for example, from 200 to 700° C. In this offgas purification, the catalyst is arranged between absorption tower and stack, preferably between absorption tower and tailgas turbine and in particular just before the tailgas turbine.

While variant 1 can be achieved by variation of oxidation catalysts and/or by a change in the pressure and temperature conditions in the process, variants 2 and 3 require the use of specific catalysts for the selective decomposition of $N_2O$, and these have to meet all requirements predetermined by the process.

In industrial oxidation processes using nitric acid as oxidant, for example in the preparation of adipic acid, large proportions of nitrous oxide which can amount to up to 50% by volume of the respective offgas are formed in the process. The temperatures of the offgas can increase to up to about 900° C. as a result of the exothermic decomposition of nitrous oxide. A suitable $N_2O$ decomposition catalyst therefore has to be active in this temperature range and has to be suitable for long-term use in this temperature range.

Intensive research on catalysts which make it possible to decompose $N_2O$ into the unproblematical components $N_2$ and $O_2$ has been carried out over the years. The range of possible catalyst materials extends from catalysts which contain noble metals and have preferably been applied to nonmetallic inorganic support materials through microporous framework silicates (zeolites) which have been cation-exchanged or contain metal oxides to transition metal oxides and mixed oxides having a perovskite or perovskite-like structure or a spinel structure.

The in-principle suitability of many of the catalyst materials mentioned has been demonstrated in the technical and patent literature but elevated pressure, very high operating temperatures and corrosive conditions place particularly great demands on the catalysts not only in respect of their catalytic activity and selectivity but in particular also in terms of their thermal and chemical stability over prolonged periods of time.

Catalysts for use according to the secondary measure (hereinafter referred to as "secondary catalyst") in nitric acid plants first of all have to have a high thermal stability to be able to operate over the long term at the high temperatures of typically from 800 to 1000° C. which are required. This thermal stability is possessed neither by simple noble metal catalysts, which are deactivated or vaporize at these temperatures, nor by zeolite or hydrotalcite structures, whose framework structure is destroyed at these temperatures. High-temperature-resistant ceramic catalysts are therefore a possible alternative.

Secondary catalysts often comprise a high-temperature-resistant ceramic support material which can itself have catalytic properties but does not necessarily have to have such properties and also one or more active components. The catalytically active component can be distributed homogeneously in the ceramic matrix or be present as a layer applied to the surface. This results in a further requirement which a secondary catalyst has to meet, namely that no chemical reaction between ceramic support and active component, which would inevitably lead to deactivation, can take place at the high use temperatures.

It is known from the literature that especially transition metal oxides and in particular cobalt oxide $CO_3O_4$ are very good catalysts, i.e. active components, for the decomposition of $N_2O$. Mixed oxides containing transition metals and having a perovskite structure, a perovskite-like structure or a spinel structure have also been described and examined in detail many times (N. Gunasekaran et al., Catal. Lett. (1995), 34 (3,4), pp. 373-382).

The disadvantage of the comparatively high price of these catalysts is countered in the prior art by the costly active components either being dispersed in an inexpensive ceramic matrix or applied to the surface of such a ceramic support material. However, in the majority of cases, the studies on these catalysts have been restricted to operating temperatures in the range from 300 to 600° C. At elevated temperatures as occur, for example, during use as secondary catalyst in plants for the preparation of nitric acid, is new problems arise, especially unsatisfactory sintering stability and the tendency for chemical reactions to occur between support material and active component, as a result of which the catalyst can lose its activity (deactivation).

In the specific case of the secondary catalyst (decomposition of $N_2O$ in the presence of $NO_x$, the target product of the process), there is the further important requirement of selectivity of the $N_2O$ decomposition over the decomposition of $NO_x$, which the catalyst has to meet.

A further requirement which the bed of secondary catalysts has to meet is a comparatively low weight of the bed, since only a limited space is available in the plant and the plant components can be stressed to only a limited extent by the weight of the catalyst. Low catalyst weights can in principle be achieved by the use of catalysts having a high activity and/or low bulk density.

The objective in the development of a secondary catalyst is thus to find a material system and a production process by means of which the challenges mentioned can be met. Here, the use of $Co_3O_4$ and/or Co-containing mixed oxides (e.g. perovskites of the general composition $La_{1-x}A_xCo_{1-y}B_yO_3$ where A=Sr, Ca, Ba, Cu, Ag; B=Fe, Mn, Cr, Cu; x=0 to 1 and y=0 to 0.95), which are excellent in respect of their catalytic activity for the decomposition of $N_2O$, is particularly problematical since the irreversible chemical reaction of $Co_3O_4$ with many support materials, e.g. $Al_2O_3$, which occurs at temperatures above about 900° C. leads to a loss of catalytic activity.

WO-A-00/13,789 describes a secondary catalyst comprising alkaline earth metal compounds (preferably MgO) as support material. This has the advantage that MgO itself has some catalytic activity for the decomposition of $N_2O$ and the proportion of costly active components can therefore be reduced. A disadvantage is that the selectivity is not 100% and $NO_x$ is sometimes also decomposed. Furthermore, long-term tests on this material system under realistic conditions show that, here too, Co ions migrate from the active phase $Co_3O_4$ into the MgO lattice and an $Mg_{1-x}Co_xO$ solid-state compound is formed, which is associated with deactivation of the catalyst.

A similar material system comprising cobalt oxide as active component and magnesium oxide as support material is described in U.S. Pat. No. 5,705,136. Here too, the problems of unsatisfactory sintering stability in the high-temperature range are recognized, so that the catalysts described in this document are suitable for use at temperatures in the range from 400 to 800° C. but not for high-temperature use in nitric acid plants.

Irreversible solid-state reactions between transition metal oxides and $ZrO_2$ are also known, so that zirconium oxide (mentioned as support material in JP-A-48/089,185) is also ruled out in the high-temperature range.

WO-A-02/02,230 claims a catalyst comprising $Co_{3-x}M_xO_4$ (M=Fe, Al and x=0 to 2) as active component on a $CeO_2$ support. In actual fact, no reaction between active component and support material takes place here at a use temperature of 900° C. and the selectivity of the catalytic reaction is also improved by $CeO_2$. However, price, availability and the tremendous weight are problematical for practical use of a catalyst comprising a solid support composed of $CeO_2$.

A wider range of possible catalyst materials is available for the elimination of $N_2O$ from the tailgas of nitric acid plants because of the lower offgas temperatures and therefore operating temperatures. Furthermore, the requirement for selectivity over other nitrogen oxides no longer applies. However, there is instead the new problem of the deactivating influence of NO on the decomposition of $N_2O$.

In Greenhouse Gas Control Technologies, Elsevier Science Ltd. 1999, pp. 343-348, F. Kapteijn et al. describe cobalt- and rhodium-doped hydrotalcite structures as active $N_2O$ catalysts at low operating temperatures. A further very detailed publication by F. Kapteijn's group may be found in Applied Catalysis B: Environmental 23 (1999), pp. 59-72. The disadvantage of hydrotalcites is explicitly stated in, for example, EP-A-1,262,224: gas constituents such as oxygen, water or NO adversely affect the $N_2O$ conversion over the catalyst. Use in real industrial offgases is therefore virtually ruled out.

Particular attention has hitherto also been paid to zeolites. Active species such as Fe, Cu or Co can be incorporated into these microporous framework silicates by cation exchange or mechanical mixing, which in the combination of active component/pore structure gives very active catalysts for the decomposition of $N_2O$. Thus, for example, US-A-2003/0143142 describes an Fe-containing zeolite which is used as tertiary catalyst and displays no deactivation by NO but instead the decomposition of $N_2O$ over the catalysts is even promoted by the presence of small amounts of $NO_x$. The disadvantage of zeolites is their sensitivity to water vapor present in the offgas and their limited thermal stability, which, taking account of the minimum temperature required for the decomposition of $N_2O$, gives a limited temperature window in which these zeolite catalysts can be used.

Supported noble metal catalysts are likewise suitable as tertiary catalysts, but are many times as expensive as ceramic catalysts which are free of noble metals.

DE-A-100 06 103 describes a tertiary catalyst which is produced by mechanical mixing of MgO and cobalt oxide (preferably $Co_3O_4$) or of precursors of these oxides by means of dry pressing and subsequent heat treatment. At use temperatures in the range from 350 to 550° C., the problem of a solid-state reaction between the two oxides does not occur.

However, these catalysts are found to be susceptible to $NO_x$ in the offgas. Although the deactivation in respect of the decomposition of $N_2O$ which occurs here is reversible, this reversal is difficult to carry out under industrial use conditions.

Studies on the catalytic decomposition of nitrous oxide into nitrogen and oxygen are known from Applied Catalysis B: Environmental, Elsevier, vol. 64, no. 3-4; pp. 234-242 (2006). The catalyst described in this document is produced by impregnation of a monolithic support which has been provided with a "washcoat" of gamma-aluminum oxide and cerium oxide and has subsequently been impregnated with an active transition metal component, for example a cobalt salt. On heating this catalyst, part of the active transition metal component is incorporated into the aluminum oxide layer.

Applied Catalysis A: General, Elsevier, vol. 301, no. 2; pp. 145-151 (2006) describes the use of catalysts supported on aluminum oxide for the oxidation of CO or of hydrocarbons.

FR 2 860 734 A describes the use of supported catalysts for the combustion of soot, in particular soot in the exhaust gases from motor vehicles.

EP-A-1,147,813 describes a shaped ceramic catalyst body for the selective decomposition of $N_2O$. Here, supports having a high proportion of MgO are used.

SUMMARY OF THE INVENTION

It is an object of the present invention to provide catalysts which overcome the major part of the abovementioned disadvantages and problems. The catalysts according to the invention should also be able to be produced by a very flexible production process which makes it possible for them to be used universally (both in the high-temperature range and in the low-temperature range) in industrial plants in which $N_2O$ problems occur. The use of an inexpensive support material should make the catalysts attractive from an economic point of view, too.

DETAILED DESCRIPTION OF THE INVENTION

The invention is described in detail below by reference to the various drawings and examples. Such discussion is for purposes of illustration only. Modifications to particular examples within the spirit and scope of the present invention, set forth in the appended claims, will be readily apparent to one of skill in the art. Terminology used herein is given its ordinary meaning unless otherwise stated herein.

The present invention provides catalysts for the decomposition of $N_2O$ into nitrogen and oxygen in the gas phase, which comprises a porous support composed of polycrystalline or vitreous inorganic material comprising magnesium oxide or a ceramic mixed oxide comprising at least 50% by mass of magnesium oxide, a cerium oxide functional layer applied thereto and a layer of oxidic cobalt-containing material applied thereto.

The catalysts of the invention thus comprise a support and a plurality of specific functional layers applied thereto.

The supports are mainly supports made up of inorganic oxides, of inorganic mixed oxides or mixtures of inorganic oxides. These supports can be produced by sintering processes and are thus porous and polycrystalline (hereinafter also referred to as "ceramic" or "ceramics").

Preference is given to ceramic supports.

The support material used is magnesium oxide MgO. This can be pure magnesium oxide or a mixed oxide comprising at least 50% by mass, preferably at least 80% by mass, of magnesium oxide. As natural contamination or as deliberate addition to improve the mechanical properties, the ceramic mixed oxide which is preferably used can comprise not only MgO but up to 50% by mass, preferably up to 20% by mass, of other inorganic oxides, in particular $SiO_2$, $Al_2O_3$, CaO and/or $Fe_2O_3$.

Magnesium oxide is an inexpensive, readily available support material and is therefore particularly preferred; it also has, at least in the high-temperature range, some intrinsic catalytic activity for the decomposition of nitrous oxide. For cost reasons and for reasons of the catalyst weight, cerium oxide should not be present in the support or be present only in small amounts, for example up to 10% by weight, based on the weight of the support.

The support material or the catalyst produced therefrom is in the form of shaped bodies of any size and geometry, preferably geometries which have a large ratio of surface area to volume and produce a very small pressure drop when gas blows through them.

Preference is given to shaped bodies of the support materials and the catalysts in which the ratio of surface area to volume is from 0.5 to 10 $mm^{-1}$, in particular from 1 to 5 $mm^{-1}$.

Typical geometries are all geometries known in catalysis, e.g. cylinders, hollow cylinders, multi-hole cylinders, rings, crushed material, trilobes or honeycomb structures.

The shaped bodies of support material can be produced by shaping processes known in ceramics processing, e.g. dry pressing, granulation or extrusion.

Use is made of either fully heat-treated support material, that is to say magnesium oxide or a blend of magnesium oxide with other metal oxides, or preferably a precursor of this oxide or these oxides. In the case of a magnesium salt, it is possible to use, for example, magnesium carbonate which is converted into the oxidic form only during the subsequent thermal treatment. The use of $MgCO_3$ is particularly advantageous in the preparation of plastic mass for extrusion, since in contrast to MgO it does not tend to undergo hydration.

To carry out shaping, water and also organic and/or inorganic additives can be added to the solid, and in the case of dry processing sometimes also small amounts of graphite.

Shaping and any subsequent drying is followed by the thermal treatment.

The heat treatment of the green bodies to form porous MgO-containing supports takes place at temperatures at which the inorganic constituents of the green body sinter to form the porous support. Typical sintering temperatures are above 900° C.; but lower sintering temperatures are also possible. When magnesium salts such as magnesium carbonate are used, complete conversion into magnesium oxide is ensured above 900° C.

Preference is given to sintering temperatures in the range from 1000 to 1300° C. As the sintering temperature increases, the tendency of the inorganic support material, in particular MgO, to undergo hydration is reduced and the mechanical strength of the shaped bodies increases. On the other hand, the open porosity and thus the internal surface area of the porous support is decreased.

The porosity of the support is critical for the effectiveness of the catalyst. Porosity is important for unhindered mass transfer, i.e. for the transport of starting materials and products to and from the active surface, which is in turn a critical criterion, i.e. rate-determining step, for the decomposition of $N_2O$ at high operating temperatures. The choice of support material can thus have a critical influence on the activity and the selectivity of the finished catalyst. The separate production of support and cerium oxide functional layer allows optimal setting of the desired properties such as porosity, morphology and texture. This is not possible without separation of support material and cerium oxide functional layer.

The open porosity of the porous supports is typically in the range from 20 to 60%, preferably in the range from 40 to 50%, based on the total volume of the ceramic support. As a person skilled in the art will know, open porosity is the proportion of pores in the shaped body which are connected to at least one surface of the shaped body.

The porous support preferably has a total volume of open pores in the range from 100 to 600 $mm^3/g$ and particularly preferably in the range from 200 to 350 $mm^3/g$.

The average pore size of the porous support is typically from 30 to 300 nm (determined by mercury porosimetry). The distribution of the pore diameters is preferably bimodal, with the smaller pore diameters preferably being in the range from 20 to 50 nm and the larger pore diameters preferably being in the range from 200 to 400 nm.

The specific surface area of the porous support is preferably in the range from 1 to 200 $m^2/g$ and particularly preferably in the range from 10 to 50 $m^2/g$ (measured by the BET method).

The choice of sintering temperature in an individual case in the production of the porous support is made according to the planned use temperature and other requirements which the catalyst has to meet in the specific case.

Furthermore, the ceramic support of the catalyst of the invention is coated on the surface first with at least one functional layer of cerium oxide and then with at least one further functional layer comprising oxidic cobalt.

The at least three-layer structure of porous support—cerium oxide functional layer—functional layer comprising oxidic cobalt is a necessary prerequisite for ensuring the desired properties of the catalyst. The multilayer structure of the catalysts of the invention can, for example, be established by means of an electron microscope.

The intermediate layer of cerium oxide simultaneously performs a number of functions. Firstly, when used in the high-temperature range it acts as "diffusion barrier" to prevent a solid-state reaction between the porous support, in particular the MgO-containing support, and the Co-containing active component, which would lead to deactivation of the catalyst.

In addition, cerium oxide itself has an albeit small intrinsic catalytic activity for the decomposition of $N_2O$ and is also able to improve the selectivity of $N_2O$ decomposition over the decomposition of $NO_x$ in the high-temperature range. In the low-temperature range (when used as tertiary catalyst), the cerium oxide layer reduces the susceptibility of the catalyst to $NO_x$ in the offgas.

The cerium oxide functional layer can be pure cerium oxide, in particular $CeO_2$, or can be a mixed oxide containing cerium oxide as main component. In typical mixed oxides, up to 50 mol %, preferably up to 20 mol %, of the cerium ions have been replaced by other metal ions, for example by ions of the second main group of the Periodic Table and/or the lanthanides, in particular of Sr, Ca, Y, Sc, Sm, La and/or of Gd.

The cerium oxide functional layer can preferably be applied by impregnation.

For this purpose, the sintered porous supports can be steeped in an aqueous solution of a cerium salt or a mixture of cerium salt and salts of other metals, particularly preferably in a solution of Ce nitrate.

Improved uptake of the solution by the support exploiting its porosity can be achieved by application of a vacuum.

Concentration and volume of the impregnation solutions can be selected at will depending on the amount of material to be applied for the cerium oxide functional layer.

The impregnation time can preferably be from 15 to 30 minutes. Longer or shorter impregnation times are likewise possible.

After the impregnation, the ceramic supports which have now been coated or infiltrated with the materials for formation of the cerium oxide functional layer are either only dried or else sintered.

This impregnation with materials for forming the cerium oxide functional layer can, if necessary, be repeated a number of times. Supports which have already been coated with materials for forming the cerium oxide functional layer can be subjected to the same procedure a number of times, for example from one to three more times. This increases the future layer thickness of the cerium oxide functional layer.

The positive effects of the cerium oxide on the catalytic reaction are increased, but the production cost and the price of the catalyst are increased. Nevertheless, this provides the opportunity of producing a lighter and sintering-stable $N_2O$ catalyst which is orders of magnitude cheaper than when a compact cerium oxide support is used.

After production of the cerium oxide functional layer, the coated ceramic support is coated with a catalytically active phase comprising cobalt oxide.

The phase comprising cobalt oxide can be any active materials comprising oxidic cobalt.

The oxidic cobalt compound, or if a plurality of oxidic cobalt compounds are present at least one of these, preferably has a perovskite or spinel structure. Examples of cobalt compounds which can be used according to the invention are $Co_3O_4$ or cobalt-containing mixed oxides such as $LaCoO_3$. The use of appropriately doped compounds such as $Cu_xCo_{3-x}O_4$ or $La_{1-x}Sr_xCoO_3$, where x is a real number in the range from 0.01 to 0.5, is also possible according to the invention.

In a further preferred embodiment, at least part of the cobalt is present in the chemically trivalent state. In this embodiment, the catalyst of the invention contains oxidic cobalt compounds in which at least 30% by weight, preferably more than 50% by weight, of the Co-atoms are present in the chemically trivalent state. The oxidation state of the cobalt can be determined by means of photoelectron spectroscopy (XPS).

The essential catalyst components, i.e. the porous support materials, the cerium oxide compounds and the compounds comprising oxidic cobalt, should have a very high specific surface area to achieve a very high activity of the catalyst. The specific surface area of the finished catalyst is in the range of the specific surface area of the porous support. The specific surface area of the finished catalyst is preferably in the range from 5 to 150 $m^2/g$.

Coating with layers comprising oxidic cobalt is also preferably carried out by impregnation.

For this purpose, the porous supports which have been impregnated with cerium salts and at least dried, but preferably calcined, can be steeped in an aqueous solution of a Co-salt, preferably Co nitrate or Co acetate, or in a mixed solution containing the cations of the desired mixed oxide in the stoichiometric ratio.

Improved uptake of the solution by the support can in this case too be achieved by application of a vacuum.

Concentration and volume of the impregnation solution for the active components can be chosen freely depending on the amount of active component which is to be applied.

The impregnation time can preferably be from 15 to 30 minutes. Longer or shorter impregnation times are likewise possible.

This impregnation with impregnation solution for the active component can, if necessary, be repeated a number of times.

Supports which have already been coated with cobalt can be subjected to the same procedure a number of times, preferably from one to three further times. This increases the future layer thickness of the active layer comprising cobalt oxide.

The applied layers of Ce salts or Ce salt mixtures and Co salts or Co salt mixtures can be fired after each impregnation.

However, drying at comparatively low temperatures, for example at temperatures of about 200° C., is also sufficient to fix the applied layer.

After conclusion of the last impregnation, the final firing of the applied layers can be carried out.

The temperature here is determined mainly by the desired field of use of the catalyst.

In the case of a secondary catalyst, the firing temperature has to be above the later operating temperature, i.e. generally above 900° C.

On the other hand, the layers of a tertiary catalyst can be fired at significantly lower temperatures, for example at 600° C.

The catalyst of the invention has a comparatively low bulk density. This is typically up to 2 g/cm$^3$, preferably from 0.5 to 2 g/cm$^3$, particularly preferably from 0.75 to 1.5 g/cm$^3$. The bulk density is determined by introducing the catalyst into a cylinder having a known volume and determining the mass of catalyst introduced.

The proportion of porous support, based on the total mass of the catalyst, is preferably at least 85% by weight, particularly preferably from 90 to 95% by weight.

The proportion of cerium oxide functional layer, based on the total mass of the catalyst, is preferably from 2 to 14% by weight, particularly preferably from 5 to 10% by weight.

The proportion of cerium oxide functional layer, based on the total mass of the catalyst, is preferably from 2 to 14% by weight, particularly preferably from 5 to 10% by weight.

The proportion of functional layer comprising oxidic cobalt, based on the total mass of the catalyst, is preferably from 0.1 to 5% by weight, particularly preferably from 1 to 5% by weight.

The invention additionally provides a process for producing the above-described catalyst, which comprises the measures:

i) production of a porous support composed of polycrystalline or vitreous inorganic material comprising magnesium oxide or a ceramic mixed oxide comprising at least 50% by mass of magnesium oxide by sintering a green body in a manner known per se, ii) single or multiple impregnation of the porous support obtained in step i) with a solution containing a dissolved cerium salt, iii) drying and/or calcination of the impregnated support obtained in step ii) to produce a cerium oxide functional layer or a precursor of the cerium oxide functional layer, iv) single or multiple impregnation of the coated support obtained in step iii) with a solution containing a dissolved cobalt salt and v) drying and/or calcination of the impregnated support obtained in step iv) to produce a functional layer comprising oxidic cobalt or a precursor of a functional layer comprising oxidic cobalt.

The composition of the catalyst of the invention and the range of variation of the production process of the invention allow flexible use of this material system as catalyst for the decomposition of $N_2O$ in plants or processes in which $N_2O$ is formed. These can be plants for industrial production, waste incineration plants, water treatment plants, gas turbines or motor vehicles. In the case of plants for industrial production, these can be, in particular, plants for the preparation of nitric acid or of caprolactam in which the catalyst of the invention can be used both as secondary catalyst in the high-temperature range and as tertiary catalyst in the low-temperature range; or the plants can be plants for the preparation of polybasic carboxylic acids, in particular polybasic aliphatic carboxylic acids, very particularly preferably adipic acid, in which a precursor of this acid is oxidized by means of nitric acid.

The catalytic activity for the decomposition of $N_2O$ and thus the necessary operating temperature of the catalyst or the operating temperature predetermined by the process can be set via the thermal pretreatment of the support material which results in a particular porosity (=internal surface area), via its geometry (external surface area) and via variation of the thickness of the cerium oxide functional layer and/or the cobalt oxide functional layer and by variation of the firing temperature for these layers.

One of the most important prerequisites for the long-term stability of the catalyst of the invention is that the two functional layers of cerium oxide and cobalt oxide are applied in succession and not simultaneously (e.g. by impregnation with a mixed Ce—Co solution).

In the case of such a simultaneous impregnation, as described in JP-A-48/089,185 for catalysts based on $ZrO_2$, cerium oxide could not act as diffusion barrier and cobalt ions would be incorporated into the ceramic support material, e.g. into the MgO lattice, at relatively high temperatures, which would lead to deactivation of the catalyst. The cerium oxide functional layer has to be fixed on the ceramic support by drying, for example at about 200° C., and/or by firing, for example at 500-1000° C., before application of the layer comprising cobalt oxide.

The catalysts of the invention can be used in all processes in which the decomposition of nitrous oxide is necessary.

The catalysts of the invention are preferably used in industrial plants in which nitrous oxide is formed, in waste incineration plants, water treatment plants, gas turbines or motor vehicles, particularly preferably in plants for the preparation of caprolactam and in particular in plants for the preparation of nitric acid. The catalysts of the invention are very particularly preferably used as secondary catalysts or as tertiary catalysts in nitric acid plants or in plants for the preparation of caprolactam.

When used as tertiary catalyst in nitric acid plants or caprolactam plants, the catalysts of the invention are typically used in the temperature range from 300 to 700° C., preferably from 400 to 700° C., in particular from 450 to 650° C. The tertiary catalyst is preferably positioned between absorption tower and tailgas turbine, particularly preferably immediately upstream of the tailgas turbine. In a further preferred embodiment of use as tertiary catalyst, the catalyst of the invention is used after a preceding stage to reduce the content of $NO_x$; here, the entry concentrations of $NO_x$ into the downstream stage are less than 200 ppm, preferably less than 100 ppm and very particularly preferably less than 50 ppm. When the catalyst of the invention is used as tertiary catalyst, it is preferably used at pressures of from 3 to 15 bar (absolute), particularly preferably at pressures of from 4 to 12 bar (absolute). When used as tertiary catalyst, the catalyst of the invention is preferably used at space velocities of from 2000 to 200 000 h$^{-1}$, particularly preferably at space velocities of from 5000 to 100 000 h$^{-1}$ and very particularly preferably at space velocities of from 10 000 to 50 000 h$^{-1}$. When used as tertiary catalyst, the catalyst of the invention is preferably used in honeycomb form or used so that the gas can flow through it laterally, for example in radial baskets.

When used as secondary catalyst in nitric acid plants or in caprolactam plants, the catalysts of the invention are typically used in the temperature range from 800 to 1000° C., preferably from 850 to 950° C. The secondary catalyst is in this case positioned downstream of the catalyst for ammonia combustion and upstream of the absorption tower, particularly preferably between the catalyst for ammonia combustion and the first heat exchanger. When the catalyst of the invention is used as secondary catalyst, it is preferably used at space velocities of from 10 000 to 300 000 h$^{-1}$, particularly preferably at space velocities of from 20 000 to 200 000 h$^{-1}$, and very particularly preferably at space velocities of from 30 000 to 100 000 h$^{-1}$. When used as secondary catalyst, the catalyst of the invention is likewise preferably used so that it produces a very low pressure drop, for example in the form of a bed of hollow cylinders or in honeycomb form.

The above-described uses are likewise subject matter of the present invention.

The following examples illustrate the invention without restricting it.

Catalyst Production

EXAMPLE 1

Catalyst I

A mixture of magnesite (MgCO$_3$) and pseudoboehmite (AlO(OH)) was plasticized and extruded as solid extrudate. The extrudate obtained was cut into solid cylinders having a length of 6 mm and a diameter of 4 mm and these green bodies were sintered at 1200° C. for two hours. This gave ceramic supports having the composition 0.95 mol of MgO and 0.05 mol of Al$_2$O$_3$. The pore volume determined by mercury porosimetry was 350 mm$^3$/g. The content of open pores determined by mercury porosimetry was 58%.

400 g of these ceramic supports were admixed with 400 ml of a 0.5 molar aqueous solution of cerium nitrate and treated for 30 minutes by application of a vacuum. The supports were subsequently dried at 120° C. for two hours and fired at 900° C. for two hours. This gave ceramic supports impregnated with cerium oxide.

400 g of these ceramic supports which had been impregnated with cerium oxide were admixed with 400 ml of a 0.5 molar aqueous solution of cobalt acetate and treated by application of a vacuum for 30 minutes. The residual solution was subsequently separated off, the impregnated shaped bodies were dried at 120° C. for two hours and fired at 900° C. for two hours. This gave ceramic supports which were impregnated with cerium oxide and cobalt oxide and whose porosity was characterized as follows by mercury porosimetry:
Pore volume: 340 mm$^3$/g
Content of open pores: 52%.

EXAMPLE 2

Catalyst II

A mixture of magnesite (MgCO$_3$) and pseudoboehmite (AlO(OH)) was plasticized and extruded as solid extrudate. The extrudate obtained was cut into solid cylinders having a length of 6 mm and a diameter of 4 mm and these green bodies were sintered at 1200° C. for two hours. This gave ceramic supports having the composition 0.80 mol of MgO and 0.20 mol of Al$_2$O$_3$. The pore volume determined by mercury porosimetry was 290 mm$^3$/g. The content of open pores determined by mercury porosimetry was 49%. In addition, a BET surface area of 19.5 m$^2$/g was determined.

400 g of these ceramic supports were admixed with 400 ml of a 0.5 molar aqueous solution of cerium nitrate and treated for 30 minutes by application of a vacuum. The supports were subsequently dried at 120° C. for two hours and fired at 900° C. for two hours. This gave ceramic supports impregnated with cerium oxide.

400 g of these ceramic supports which had been impregnated with cerium oxide were admixed with 400 ml of a 0.5 molar aqueous solution of cobalt acetate and treated by application of a vacuum for 30 minutes. The residual solution was subsequently separated off, the impregnated shaped bodies were dried at 120° C. for two hours and fired at 900° C. for two hours. This gave ceramic supports which were impregnated with cerium oxide and cobalt oxide and whose porosity was characterized as follows by mercury porosimetry:
Pore volume: 289 mm$^3$/g
Content of open pores: 42%.
In addition, a BET surface area of 19.6 g/m$^2$ was determined.

EXAMPLE 3

Catalyst III

The procedure for producing catalyst II was repeated with the modification that the ceramic support which had been impregnated with cerium oxide was impregnated twice with the aqueous solution of cobalt acetate. For this purpose, the dried shaped bodies obtained after the first impregnation with cobalt acetate were admixed again with 400 ml of the 0.5 molar cobalt acetate solution and treated for 30 minutes by application of a vacuum. The supports were subsequently dried at 120° C. for two hours and fired at 900° C. for two hours.

This gave ceramic supports which were impregnated with cerium oxide and cobalt oxide and whose porosity was characterized as follows by mercury porosimetry:
Pore volume: 289 mm$^3$/g
Content of open pores: 48%.
In addition, a BET surface area of 19.6 g/m$^2$ was determined.

EXAMPLE 4

Catalyst IV

The procedure for producing catalyst II was repeated with the modification that 400 g of the ceramic supports which had been impregnated with cerium oxide were admixed with 400 ml of a 0.25 molar aqueous solution of cobalt acetate and treated for 300 minutes by application of a vacuum. The residual solution was subsequently separated off and the impregnated shaped bodies were dried at 120° C. for two hours and fired at 900° C. for two hours. This gave ceramic supports impregnated with cerium oxide and cobalt oxide.

EXAMPLE 5

Catalyst V

A mixture of magnesite (MgCO$_3$) and pseudoboehmite (AlO(OH)) was plasticized and extruded as solid extrudate. The extrudate obtained was cut into solid cylinders having a length of 6 mm and a diameter of 4 mm and these green bodies were sintered at 1200° C. for two hours. This gave ceramic supports having the composition 0.8 mol of MgO and 0.2 mol of $Al_2O_3$.

400 g of these ceramic supports were admixed with 400 ml of a 0.5 molar aqueous solution of cerium nitrate and treated for 30 minutes by application of a vacuum. The supports were subsequently dried at 120° C. for 30 minutes.

This treatment, namely impregnation with cerium nitrate and drying at 120° C., was repeated three more times. However, in the last impregnation stage the ceramic supports were dried at 120° C. for one hour. The impregnated supports were subsequently fired at 900° C. for two hours. This gave ceramic supports impregnated with cerium oxide.

400 g of these ceramic supports which had been impregnated with cerium oxide were admixed with 400 ml of a 0.5 molar aqueous solution of cobalt acetate and treated by application of a vacuum for 30 minutes. The residual solution was subsequently separated off, the impregnated shaped bodies were dried at 120° C. for 30 minutes.

This treatment, namely impregnation with cobalt acetate and drying at 120° C., was repeated three more times. However, in the last impregnation stage the supports were dried at 120° C. for one hour. The impregnated support was subsequently fired at 900° C. for two hours. This gave ceramic supports which were impregnated with cerium oxide and cobalt oxide and whose porosity was characterized as follows by mercury porosimetry:

Pore volume: 204 $mm^3/g$
Content of open pores: 43%.

In addition, a BET surface area of 14.2 $g/m^2$ was determined.

EXAMPLE 6

Catalyst VI

A support material was produced as in the case of catalyst V. The sintered pellets were subsequently milled to give a powder having particle sizes of less than or equal to 250 μm.

400 g of this ceramic support powder were admixed with 400 ml of a 0.5 molar aqueous solution of cerium nitrate and treated for 30 minutes by application of a vacuum. The powder was subsequently dried at 120° C. for 2 hours. This gave ceramic support powder impregnated with cerium oxide.

400 g of this ceramic support powder which had been impregnated with cerium oxide were admixed with 400 ml of a 0.5 molar aqueous solution of cobalt acetate and treated for 30 minutes by application of a vacuum. The residual solution was subsequently separated off and the impregnated powder was dried at 120° C. for 2 hours.

The powder was pressed to give pellets and sintered at 600° C. for 2 hours. The sintered bodies obtained were comminuted to give granules having diameters in the range from 2.0 to 2.5 mm. This gave ceramic supports which were impregnated with cerium oxide and cobalt oxide and whose porosity was characterized as follows by mercury porosimetry:

Pore volume: 454 $mm^3/g$
Content of open pores: 57%.

In addition, a BET surface area of 40.3 $g/m^2$ was determined.

EXAMPLE 7

Catalyst VII

The procedure for producing catalyst VI was repeated with the modification that the ceramic support powder which had been impregnated with cerium oxide was impregnated with 400 ml of a 1.0 molar aqueous solution of cobalt nitrate.

This gave ceramic supports which were impregnated with cerium oxide and cobalt oxide and whose porosity was characterized as follows by mercury porosimetry:

Pore volume: 321 $mm^3/g$
Content of open pores: 42.5%.

In addition, a BET surface area of 31.1 $g/m^2$ was determined.

USE EXAMPLES

Examples A1 to A7

The activity of the catalysts was determined in a flow-through fused silica reactor with programmable temperature control and with on-line analysis. For this purpose, a bed of in each case 13.9 g of the catalyst to be examined were placed on a close-meshed cordierite honeycomb and a feed gas having the compositions described below was in each case passed through the reactor at a space velocity of 10 000 $h^{-1}$. The temperature was increased at a heating rate of 5 K/minute from an initial value of 50° C. to a final temperature of 900° C. The temperature measurement was carried out at the catalyst bed. At the outlet of the reactor, the content of selected constituents of the gas was determined by IR spectroscopy.

The temperatures at which 90% or 100% conversion (corresponding to the sensitivity of the IR analyzer) of $N_2O$ were achieved are reported in the following table.

| Example | Catalyst | 90% conversion of $N_2O$ at a temperature (° C.) of | 100% conversion of $N_2O$ at a temperature (° C.) of |
|---|---|---|---|
| A1 [1] | I | 660 | 740 |
| A2 [1] | II | 760 | >900 |
| A3 [1] | III | 810 | >950 |
| A4 [1] | IV | 785 | >900 |
| A5 [2] | V | 590 | 680 |
| A6 [2] | VI | 560 | 600 |
| A7 [2] | VII | 495 | 560 |

[1] Composition of the feed: 84.66% of $N_2$
6.00% of $O_2$
0.20% of $N_2O$
9.0% of NO
0.14% of $H_2O$

[2] Composition of the feed: 96.8% of $N_2$
2.50% of $O_2$
0.20% of $N_2O$
0.50% of $H_2O$ While the invention has been described in connection with several embodiments, modifications of those embodiments within the spirit and scope of the present invention will be readily apparent to those of skill in the art. The invention is defined in the appended claims.

The invention claimed is:

1. A catalyst for the decomposition of $N_2O$ into nitrogen and oxygen in the gas phase, which comprises a porous support chosen from the group consisting of:
   a polycrystalline inorganic material comprising magnesium oxide;
   a polycrystalline inorganic material comprising a ceramic mixed oxide comprising at least 50% by mass of magnesium oxide;
   a vitreous inorganic material comprising magnesium oxide; and
   a vitreous inorganic material comprising a ceramic mixed oxide comprising at least 50% by mass of magnesium oxide, said porous support having a functional layer comprising cerium oxide applied thereto and a layer of oxidic cobalt-containing material applied over said cerium oxide functional layer,
wherein the layer of material comprising oxidic cobalt comprises cobalt compounds in which at least 30% of the Co atoms are present in the chemically trivalent state.

2. The catalyst as claimed in claim 1, wherein the porous support comprises ceramic material.

3. The catalyst as claimed in claim 2, wherein the ceramic mixed oxide comprises, in addition to the MgO, up to 50% by mass of another inorganic oxide chosen from the group consisting of $SiO_2$, $Al_2O_3$, CaO, $Fe_2O_3$ and mixtures thereof.

4. The catalyst as claimed in claim 2, wherein the ceramic mixed oxide comprises, in addition to the MgO, up to 20% by mass of another inorganic oxide chosen from the group consisting of $SiO_2$, $Al_2O_3$, CaO, $Fe_2O_3$ and mixtures thereof.

5. The catalyst as claimed in claim 1, wherein the ceramic mixed oxide comprises, in addition to the MgO, up to 50% by mass of another inorganic oxide chosen from the group consisting of $SiO_2$, $Al_2O_3$, CaO, $Fe_2O_3$ and mixtures thereof.

6. The catalyst as claimed in claim 1, wherein the ceramic mixed oxide comprises, in addition to the MgO, up to 20% by mass of another inorganic oxide chosen from the group consisting of $SiO_2$, $Al_2O_3$, CaO, $Fe_2O_3$ and mixtures thereof.

7. The catalyst as claimed in claim 1, wherein the open porosity of the porous support is in the range of from 20 to 60% based on the total volume of the porous support.

8. The catalyst as claimed in claim 7, wherein the catalyst has a ratio of surface area to volume of from 0.5 to 10 $mm^{-1}$.

9. The catalyst as claimed claim 8, wherein the oxidic cobalt-containing material is chosen from the group consisting of: an oxide or oxides of cobalt, a mixed oxide or mixed oxides containing cobalt; and combinations thereof.

10. The catalyst as claimed in claim 9, wherein at least one compound containing oxidic cobalt has a perovskite or spinel structure.

11. The catalyst as claimed in claim 9, wherein the cerium oxide functional layer comprises a cerium containing oxide chosen from the group consisting of: cerium oxide and mixed oxides in which up to 50 mol % of the cerium ions has been replaced by other metal ions.

12. The catalyst as claimed in claim 11, wherein the oxidic cobalt-containing material is chosen from the group consisting of: an oxide or oxides of cobalt, a mixed oxide or mixed oxides containing cobalt; and combinations thereof.

13. The catalyst as claimed in claim 12, wherein at least one compound containing oxidic cobalt has a perovskite or spinel structure.

14. The catalyst as claimed in claim 13, wherein the layer of material comprising oxidic cobalt comprises cobalt compounds in which at least 30% of the Co atoms are present in the chemically trivalent state.

15. The catalyst as claimed in claim 14, wherein its bulk density is from 0.5 to 2 $g/cm^3$, preferably from 0.75 to 1.5 $g/cm^3$.

16. The catalyst as claimed in claim 15, wherein its proportion of porous support is at least 85% by weight, its proportion of cerium oxide functional layer is from 2 to 14% by weight and its proportion of a layer of material comprising oxidic cobalt is from 0.1 to 5% by weight, with the figures being based on the total weight of the catalyst.

17. The catalyst as claimed in claim 7, wherein the catalyst has a ratio of surface area to volume of from 1 to 5 $mm^{-1}$.

18. The catalyst as claimed in claim 1, wherein the open porosity of the porous support is in the range of from 40 to 50% based on the total volume of the porous support.

19. The catalyst as claimed in claim 18, wherein the catalyst has a ratio of surface area to volume of from 0.5 to 10 $mm^{-1}$.

20. The catalyst as claimed in claim 4, wherein the catalyst has a ratio of surface area to volume of from 1 to 5 $mm^{-1}$.

21. The catalyst as claimed in claim 7, wherein the cerium oxide functional layer comprises a cerium containing oxide chosen from the group consisting of: cerium oxide and mixed oxides in which up to 50 mol % of the cerium ions has been replaced by other metal ions.

22. The catalyst as claimed in claim 1, wherein the cerium oxide functional layer comprises a cerium containing oxide chosen from the group consisting of: cerium oxide and mixed oxides in which up to 50 mol % of the cerium ions has been replaced by other metal ions.

23. The catalyst as claimed claim 22, wherein the oxidic cobalt-containing material is chosen from the group consisting of: an oxide or oxides of cobalt, a mixed oxide or mixed oxides containing cobalt; and combinations thereof.

24. The catalyst as claimed in claim 23, wherein at least one compound containing oxidic cobalt has a perovskite or spinel structure.

25. The catalyst as claimed claim 1 wherein the oxidic cobalt-containing material is chosen from the group consisting of: an oxide or oxides of cobalt, a mixed oxide or mixed oxides containing cobalt; and combinations thereof.

26. The catalyst as claimed in claim 24 wherein at least one compound containing oxidic cobalt has a perovskite or spinel structure.

27. The catalyst as claimed in claim 26 wherein the layer of material comprising oxidic cobalt comprises cobalt compounds in which at least 30% of the Co atoms are present in the chemically trivalent state.

28. The catalyst as claimed in claim 1, wherein at least one compound containing oxidic cobalt has a perovskite or spinel structure.

29. The catalyst as claimed in claim 28 wherein the layer of material comprising oxidic cobalt comprises cobalt compounds in which at least 30% of the Co atoms are present in the chemically trivalent state.

30. The catalyst as claimed in claim 28, wherein its bulk density is from 0.5 to 2 $g/cm^3$, preferably from 0.75 to 1.5 $g/cm^3$.

31. The catalyst as claimed in claim 30 wherein its proportion of porous support is at least 85% by weight, its proportion of cerium oxide functional layer is from 2 to 14% by weight and its proportion of a layer of material comprising oxidic cobalt is from 0.1 to 5% by weight, with the figures being based on the total weight of the catalyst.

32. A process for producing the catalyst as claimed in claim 1, which comprises:
  i.) sintering a green body to produce a porous support composed of polycrystalline or vitreous inorganic material comprising magnesium oxide or a ceramic mixed oxide comprising at least 50% by mass of magnesium oxide;
  ii.) impregnating the porous support obtained in step i) at least one time, with a solution containing a dissolved cerium salt;
  iii.) forming at least one cerium containing layer chosen from the group consisting of: cerium oxide functional layers and precursors to a cerium oxide functional layer by a treatment step chosen from the group consisting of: drying and calcination of the impregnated support obtained in step ii);

iv.) impregnating the coated support obtained in step iii) at least once with a solution containing a dissolved cobalt salt; and v.) forming a functional layer comprising a cobalt compound chosen from the group consisting of oxidic cobalt and precursors to oxidic cobalt by a treatment chosen from the group consisting of: drying and calcining the impregnated support obtained in step iv).

33. The process as claimed in claim 32, wherein sintering of the green body in step i) is carried out at temperatures in the range from 1000 to 1300° C.

34. The process as claimed in claim 32, wherein said green body used in step i) comprises a magnesium containing material chosen from the group consisting of: magnesium oxide; blends of magnesium oxide with other metal oxides; precursors thereto and combinations of any of the foregoing.

35. The process as claimed in claim 32, wherein cerium nitrate is used as cerium salt in step ii).

36. The process as claimed in claim 32, wherein the cobalt salt in step iv) is chosen from the group consisting of cobalt nitrate, cobalt acetate and combinations thereof.

37. The process as claimed in claim 36 wherein the sintering of the green body in step i) is carried out at temperatures in the range from 1000 to 1300° C.

38. The process as claimed in claim 37, wherein one of said precursors comprises magnesium carbonate.

39. The process as claimed in claim 38, wherein cerium nitrate is used as cerium salt in step ii).

40. The process as claimed in claim 39, wherein the cobalt salt used in step iv) is chosen from the group consisting of cobalt nitrate, cobalt acetate and combinations thereof.

41. The process as claimed in claim 40 wherein the sintering of the green body in step i) is carried out at temperatures in the range from 1000 to 1300° C.

42. A process for selective decomposition of nitrous oxide in gases also comprising nitric oxide, comprising passing said gas through the catalyst of claim 1 at a temperature in excess of 400° C.

43. The process for selective decomposition of nitrous oxide in gases also comprising nitric oxide as claimed in claim 42, wherein the process is carried out on a gaseous stream derived from industrial production; water treatment; waste incineration plants; a gas turbine or a motor vehicle.

44. The process for selective decomposition of nitrous oxide in gases also comprising nitric oxide as claimed in claim 43, wherein the gaseous stream is derived from a plant chosen from the group consisting of: plants for preparing caprolactam, plants for preparing nitric acid and plants for preparing polybasic carboxylic acids by oxidation by means of nitric acid.

45. The process for selective decomposition of nitrous oxide in gases also comprising nitric oxide as claimed in claim 44, wherein the catalyst is used as secondary catalyst to treat a gaseous stream at a temperature of from 800 to 1000° C., said stream being derived from a plant chosen from the group consisting of: nitric acid plants and caprolactam plants.

46. The process for selective decomposition of nitrous oxide in gases also comprising nitric oxide as claimed in claim 45, wherein the catalyst is used as tertiary catalyst to treat a gaseous stream at a temperature of from 300 to 700° C. said gaseous stream being derived from a plant chosen from the group consisting of nitric acid plants and caprolactam plants.

* * * * *

UNITED STATES PATENT AND TRADEMARK OFFICE
CERTIFICATE OF CORRECTION

PATENT NO.        : 8,871,673 B2
APPLICATION NO.   : 12/733147
DATED             : October 28, 2014
INVENTOR(S)       : Meinhard Schwefer et al.

It is certified that error appears in the above-identified patent and that said Letters Patent is hereby corrected as shown below:

On The Title Page, Item (73) Assignee, the city name should read --Dortmund--.

Signed and Sealed this
Thirtieth Day of December, 2014

Michelle K. Lee
*Deputy Director of the United States Patent and Trademark Office*